June 10, 1969  H. SCHOLL  3,448,728
CONTROLLER FOR FUEL INJECTION SYSTEMS FOR
INTERNAL COMBUSTION ENGINES
Filed Aug. 17, 1967  Sheet 1 of 7

INVENTOR
Hermann SCHOLL

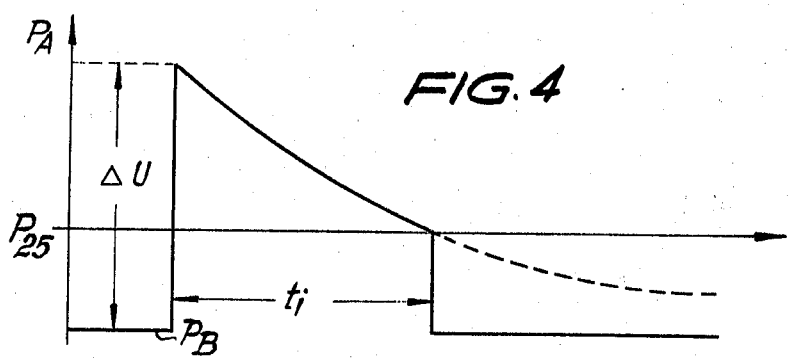
FIG. 4
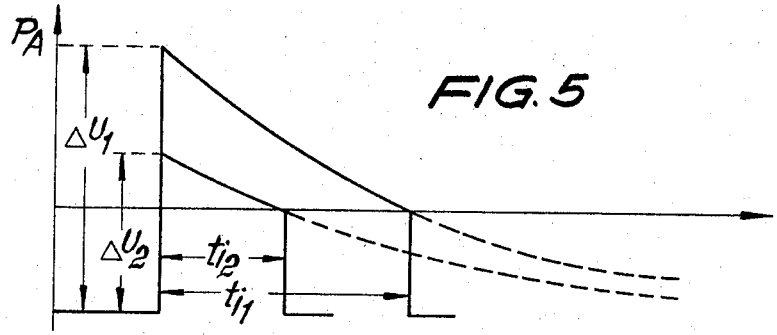
FIG. 5
FIG. 6
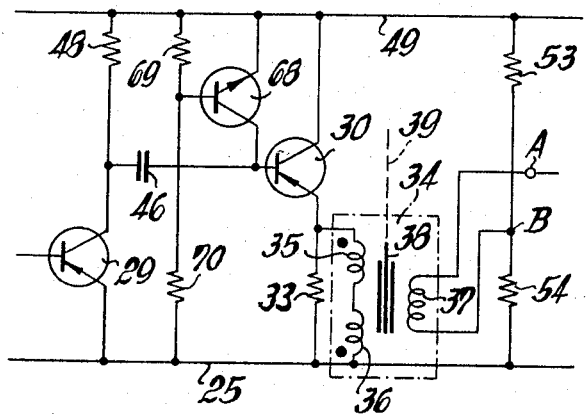

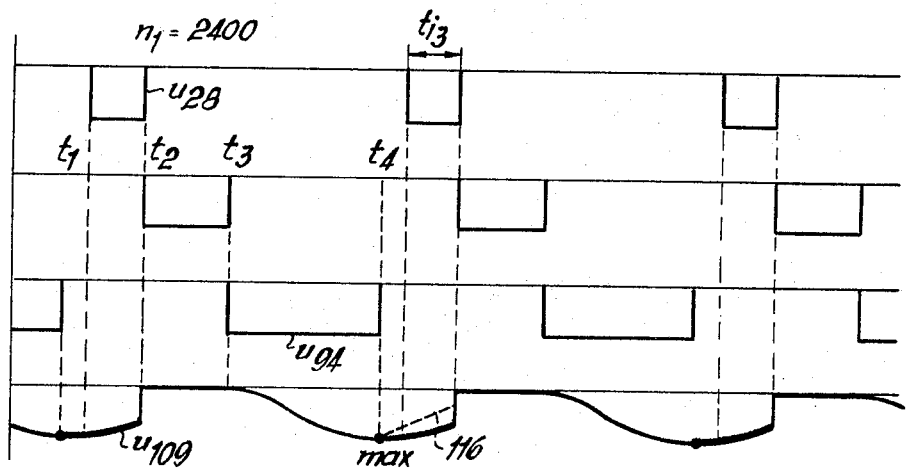
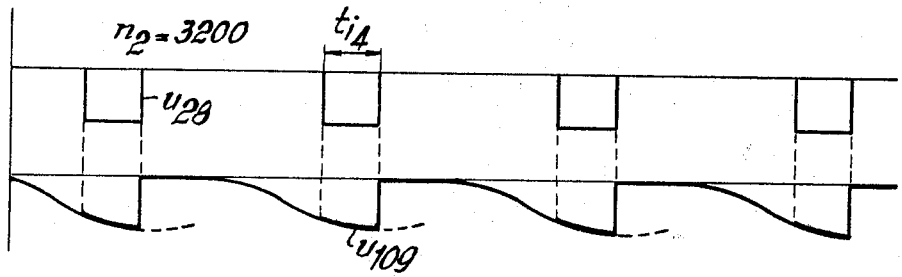
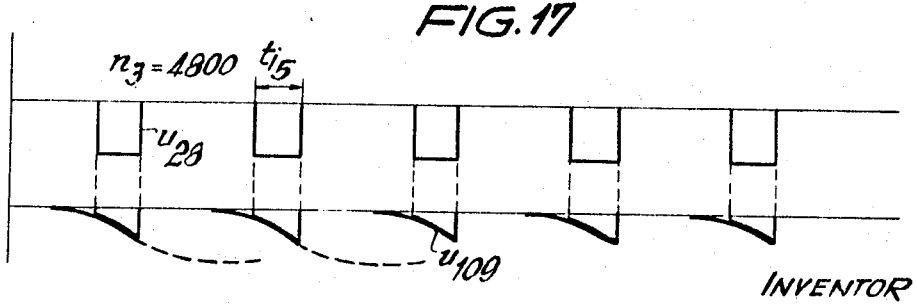

United States Patent Office 3,448,728
Patented June 10, 1969

3,448,728
CONTROLLER FOR FUEL INJECTION SYSTEMS FOR INTERNAL COMBUSTION ENGINES
Hermann Scholl, Stuttgart, Germany, assignor to Robert Bosch GmbH, Stuttgart, Germany, a limited-liability company of Germany
Filed Aug. 17, 1967, Ser. No. 661,365
Claims priority, application Germany, Aug. 31, 1966, B 88,709
Int. Cl. F02m *51/00*
U.S. Cl. 123—32                                    16 Claims

ABSTRACT OF THE DISCLOSURE

For each power stroke of the piston, an electrical impulse is generated which triggers a monstable flip-flop circuit having a condenser (46) and a differential transformer (34), including a movable core element in its interstage coupling network; the core position of the transformer determines the pulse time; by varying the characteristics of the condenser discharge circuit, non-linear operating characteristics of the engine can be accommodated and compensated.

---

The present invention relates to a fuel injection control system for internal combustion engines, and more particularly to a control system to adjust opening time of a fuel injection valve in accordance with varying requirements of the engine.

The duration of impulses to control a fuel injection system, by means of a mechanically movable core element in a differential transformer has previously been proposed, see for example, U.S. Patent 3,203,410, assigned to the assignee of the present application. A control system utilizing a mechanically movable core has been found to be resistant against wear and tear, as well as against vibrations and shocks, which is very important in motor vehicles exposed to varying road conditions. Change of the impulse duration is obtained by changing the inductivity of the transformer, which causes a corresponding change in the time constant of the timing LR circuit of a monostable flip-flop circuit. If a greater change in impulse duration is required, for example, a ratio of 1:4, difficulties are encountered because the unavoidable magnetic stray fields have to be held as small as possible, requiring a very small air gap and thus high precision in the manufacture of the magnetic circuit. Additionally, changes in the magnetic characteristics of the materials, such as variations during manufacture, magnetization due to stray fields and alignment changes occurring in use have disturbing influences because they directly affect the impulse period.

It is an object of the present invention to provide a fuel injection control system in which the aforementioned disadvantages are avoided. In particular, the control system should be so arranged that the input inductivity of the transformer has little or no influence on the impulse time.

SUBJECT MATTER OF THE PRESENT INVENTION

A flip-flop circuit, forming an impulse generator, is triggered each time that a power stroke of the engine is to occur, that is, for each fuel injection. The circuit has at least two stages which are coupled by a storage condenser, in series with a differential transformer having a movable core element. A discharge circuit for the storage condenser is provided, which may include non-linear elements to adjust the time-signal characteristics of the output derived from the transformer. The input windings of the differential transformer are connected in opposite directions; if the coupling, due to the movable core element, is symmetrical, the output signal will be zero, and the impulse period will be zero; if the coupling is unsymmetrical, then an output signal depending in its amplitude on the dis-symmetry will cause impulses of predetermined duration. The mechanical movement of the magnetic core element is coupled to the internal combustion engine itself, for example, to a vacuum chamber connected to the intake manifold, with a diaphragm linked to the movable core element.

The condenser is connected to the output of the input stage of the flip-flop circuit; by inserting an amplifier between the condenser and the differential transformer, the amplifier can be utilized at the same time as an impedance matching device and the discharge time constant of the condenser can be changed readily with little loading.

The circuit can be connected with a Zener diode in combination with a voltage divider and so arranged that as the operating potential for the entire circuit increases, the impulse time of the flip-flop circuit decreases. Thus the quantity of injected material can be made independent of variations of the potential of the source for the control circuit.

The structure, organization, and operation of the invention will now be described more specifically with reference to the accompanying drawings, wherein:

FIGS. 4 and 5 are diagrams of voltage (ordinate) versus time (abscissa) illustrating the action of the circuit of FIG. 1;

FIG. 6 illustrates a modification of the circiut of FIG. 1, taken in part;

Figure 14:
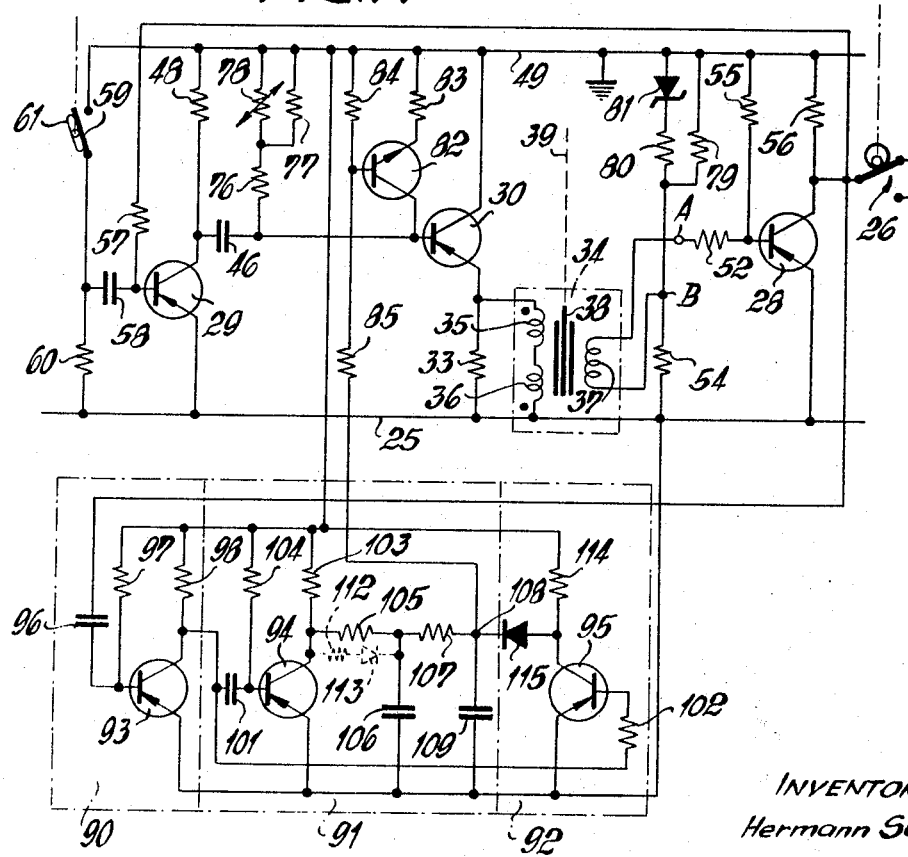
FIG. 14 is yet another modified embodiment of the circuit of FIG. 1.

And FIGS. 15 to 18 are diagrams to illustrate the operation of the circuit in accordance with FIG. 14.

Figure 1:
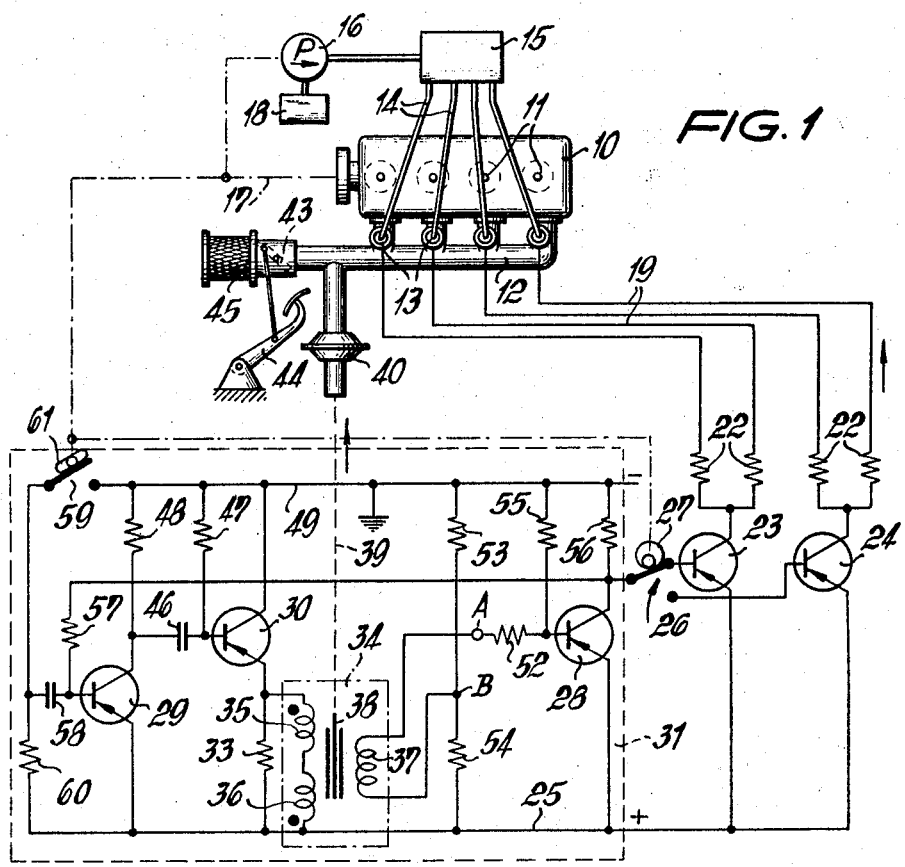
FIG. 1 is a circuit diagram of a control arrangement for an internal combustion engine fuel injection system, having a mono stable multi-vibrator and a differential transformer to change the impulse duration of the multivibrator.

Referring now to the drawings and in particular to FIG. 1:

A four-cylinder motor 10 has spark plugs 11 connected to an ignition system, not illustrated. Electromagnetically operated injection valves 13 are placed at the intake manifold stubs located immediately adjacent the inlet valves of the motor. Fuel is supplied to the injection valves 13 over fuel lines 14 connected to a distributor 15, supplied thereto by a pump 16 driven, for example, by the shaft 17 of motor 10. Pump 16 supplies fuel by suction from a tank 18 under pressure over an over pressure valve (not shown) at a pressure of, for example, 2 kg./cm.² Each of the injection valves 13 have a solenoid winding, one end of which is connected to ground, whereas the other end is connected over line 19 and then over resistances 22. A current I flowing through the solenoid coil opens the respective injection valve, so that fuel will be injected into the respective inlet stub of the manifold 12.

Two, each, of resistances 22 are connected together and jointly to the collector of a pnp power transistor 23, 24, respectively. The entire circuit is supplied by a source of potential, not shown, connected to a positive bus 25 and a negative bus 49. The emitter of transistor 23, 24 is, each, connected to positive bus 25, whereas the base of the two transistors is, each, connected to respective terminals of a transfer switch 26, operated by a cam 27 and driven from the crank shaft 17 as illustrated by the dash-dotted line in schematic form. The third, common connection of transfer switch 26 is connected to the collector of a pnp transistor 28, functioning as the output element of a monostable flip-flop multivibrator circuit, indicated generally at 31.

When motor 10 is in operation, the collector of transistor 28 is connected alternately with the base of transistor 24 and with the base of transistor 23, once during each revolution of the crank shaft 17. The timing is such that the pulses obtained from the multivibrator circuit 31 are applied alternately to transistor 23, then to transistor 24, again to transistor 23, etc. The circuit, so far described, is known and can be changed in any manner desired or required by the construction of the engine, for example, can be adapted to 6, 8 and other multi-cylinder engines or use electronic switching by using additional multi-vibrator circuits in place of the mechanical transfer switch 26.

Figure 2:
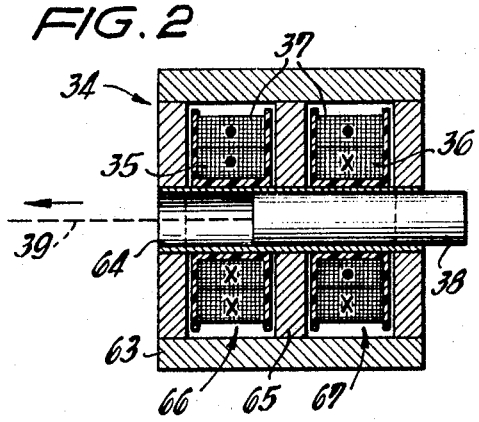
FIG. 2 is a longitudinal section along lines II—II of FIG. 3 through the differential transformer.
Figure 3:
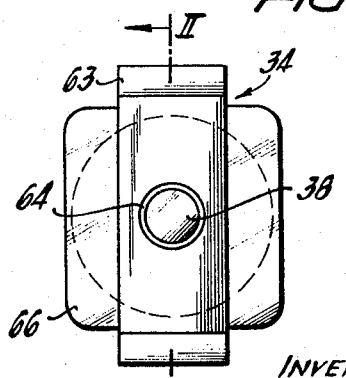
FIG. 3 is a front view of the differential transformer.

Multivibrator circuit 31 includes two pnp transistors 29, 30 besides the output transistor 28. Transistor 29 is the input element, and transistor 30, connected as an emitter follower is an impedance matching stage, besides functioning as an amplifier. A differential transformer 34, further shown in FIGS. 2 and 3, is connected to the emitter resistance 33 of transistor 30. Differential transformer 34 has a pair of oppositely wound primary windings 35, 36, a secondary winding 37, and a movable core 38, functioning as an adjustment element. Core 38 is connected over a linkage 39—shown in schematic form in dashed lines in FIG. 1—with a pressure-sensitive device 40, containing a vacuum chamber in the form usual for air pressure indication. Pressure transducer 40 is connected to the intake manifold 12 and senses the pressure therein in such a manner, that, as the vacuum in intake manifold 12 increases, linkage 39 moves core 38 in the direction of the arrow shown in FIG. 1, that is, upwardly.

A vacuum in intake manifold 12 increases with increasing throttling of the intake of a throttle valve 43 operated by an accelerator pedal 44, and connected into the intake manifold behind an air filter 45 (FIG. 1).

The multivibrator circuit 31 further contains a timing circuit. Condensers 46 and 47 together form an R-C timing network; the impulse duration determined by the R-C network can be changed by change of the position of the movable core element 38.

The multivibrator, in detail, is constructed as follows: the emitter of transistor 29 is connected to the positive bus 25; its collector connects to an electrode of condenser 46, and further over a collector resistance 48 with the negative bus 49, which is preferably grounded. The potential between buses 25, 49 may, for example, be the customary automotive potential of 12.6 v. The other electrode of condenser 46 connects to the base of transistor 30 as well as over a resistance 47 to the negative bus 49.

The collector of transistor 30 connects directly with the negative bus 49, its emitter over an emitter resistance 33 to positive bus 25 and to serially connected primary windings 35, 36 of differential transformer 34, the other terminal of which is again connected to positive bus 25.

One terminal of secondary winding 37 of differential transformer 34 connects to a test point A and then to a resistance 52, and from them to the base of transistor 28. Another terminal of secondary winding 37 connects to a junction point b, which is the tap point B of a voltage divider formed of resistances 53, 54 connected between the positive and negative buses. A resistance 55 connects the base of transistor 28 to negative line 49. The collector resistance 56 of transistor 28 likewise is connected to negative line 49. The emitter of transistor 28 is connected directly to the positive bus 25. A feedback resistance 57 interconnects the collector of transistor 28 to the base of transistor 29. The base of transistor 29 is further connected with an electrode of condenser 58, the other electrode of which connects with one terminal of a switch 59 as well as to a resistance 60 and to the positive bus 25. The other terminal of switch 59 is connected with negative bus 49. Switch 59 is operated by means of a double cam 61, driven by the shaft 17 as indicated by dash-dotted connection so that switch 59 is closed twice for each revolution of shaft 17, thus causing twice a negative impulse at the base of transistor 29. Of course, instead of the mechanical switch 59, any impulse source without mechanical contacts, for example, a magnetic or photo electric impulse transducer could be used.

FIGS. 2 and 3 illustrate the construction of the differential transformer 34 in detail; it has a rectangular frame 63 formed with a pair of bores in which a brass tube 64 is secured; a pair of separate coil elements 66, 67 are secured over the brass tube, separated by a center part 65 of ferro magnetic material.

Spool 66 has an inner winding forming the first primary 35, and an outer winding forming one half of secondary 37; spool 67 contains as an inner winding the second primary 36 and as an outer winding the second half of secondary 37. The direction of windings is indicated in the customary manner by a dot or a cross, respectively. As shown, the primary windings 35, 36 are wound in opposite directions, whereas the halves of secondary 37 have the same sense of winding. Inserted within the brass tube 64 is an axially movable core element 38. When element 38 is in its center position, as shown by the dashed lines in FIG. 2, coupling of the two primary windings 35, 36 with the secondary winding 37 will be symmetrical. As a result, an alternating current potential placed on the primary windings will induce potentials in the secondary which are of equal magnitude but opposite direction, and thus cancel each other. If the core 38 is shifted axially to the position shown in solid lines in FIG. 2, tight coupling results between the windings on spool 67, whereas the windings on spool 66 are coupled only loosely. The potential measured across secondary 37 will thus change with shift of the core 38 and the magnitude of the potential induced in the secondary 37 can be easily changed. The iron core is practically free from wear, even with frequent shifting of position, and in use has been found to have at least the ordinary life expectancy of a motor vehicle. The inductivity of the differential transformer itself is substantially without interfering influence, and complicated measures to readjust the circuit including the transformer, can be avoided.

Operation of the arrangement according to FIG. 1: Let it be assumed that the switch 59 is opened, so that the multivibrator 31 is in its quiescent state. Transistor 29 is blocked, and transistors 30 and 28 are conductive. Condenser 46 charges, so that its left electrode (FIG. 1) will be approximately at the potential of negative line 49, its right electrode being more positive, as indicated by the minus and plus signs in FIG. 1. If cam 61 now closes switch 59, the base of transistor 29 receives a negative impulse over condenser 58; transistor 29 becomes conductive. Its collector, previously strongly negative, will reach approximately the potential of positive bus 25. The sudden jump in potential on the collector is transferred over condenser 46 to the base of transistor 30, which will block. Simultaneously, its emitter, previously strongly negative, will have a sudden change in potential, in the positive direction.

The sudden change in potential on the emitter of transistor 30 is applied to the secondary 37 of the differential transformer 34, depending upon the position of core 38. If the throttle 43 is open, and thus there is little vacuum in the intake manifold 12 (practically ordinary ambient air pressure), then the potential $\Delta U$ transferred is substantial (see FIG. 4) and decreases as the vacuum increases, as seen in FIG. 5 by $\Delta U_1$ and $\Delta U_2$. Let the positive bus 25 be considered as a reference potential, $P_{25}=0$ v., then the negative potential $P_B$ will be at the junction point B of the voltage divider 53, 54. That same potential can also be measured at A when the circuit is in its quiescent state. If, however, a sudden change in potential $\Delta U$ in the secondary 37 arises, then the potential $P_A$ at measuring point A will shift in a positive direction and the base of transistor 28 will become more positive than the emitter. Transistor 28 will block and its collector will become strongly negative.

The negative potential jump is transferred to the base of transistor 29 by means of the feedback resistance 57 and keeps transistor 29 in conductive state. Further, in a condition shown in FIG. 1, transfer switch 26 will transfer the negative potential jump to the base of the power transistor 23, which will become conductive and send current through the solenoid winding of the two left injection valves 13, opening these valves.

Condenser 46 will now discharge over resistance 47. The potential at the base of transistor 30 will thus decrease in exponential function. Likewise, the potential at the emitter of transistor 30 will decrease, and this decrease will be transferred over the differential transformer 34 and can be tested at test point A, as seen in FIGS. 4 and 5. As soon as potential $P_A$ decreases to the reference potention $P_{25}$, transistor 28 again becomes conductive, its collector potential will become more positive, transistor 29 will block again over resistance 57 and transistor 30 becomes conductive, so that the potential at test point A suddenly drops to the value $P_B$. At the same time, the base of power transistor 23 becomes positive and it will block, thus closing both left injection valves 13. At the next impulse, switch 26 will be in its other position and the power transistor 24 and the two right injection valves 13 will be enabled.

FIGS. 4 and 5 illustrate the influence of different positions of the iron core 38 on the impulse time $t_1$ of the multivibrator circuit 31. FIG. 4 illustrates the maximum position, in which the secondary winding 37 has the largest potential jump $\Delta U$. Correspondingly, a long time $t_1$ elapses until the base potential of transistor 28 again becomes more negative than the emitter potential; the impulse period $t_1$ is long. This corresponds to a position of core 38 with wide open throttle 43, that is, with little vacuum in the intake manifold 12.

If the throttle is closed and the vacuum in intake manifold 12 increases, the potential jumps $\Delta U_1$ and $\Delta U_2$, seen in FIG. 5, will result. FIG. 5, of course, only illustrates representative positions; any intermediate positions are possible. At the value $\Delta U_1$, the impulse period will be reduced to the time $t_{11}$; with a value of $\Delta U_2$, the time will be $t_{12}$, as seen in FIG. 5. Thus, by moving a mechanically strong construction element—an iron core— the impulse period can be changed substantially. The input iductivity of the differential transformer has hardly any appreciable influence on the impulse frequency, in contrast to known arrangements, in which the inductivity determining the initial time constant must be adjusted each time before the apparatus is put to use.

FIG. 6 illustrates a variation of the circuit in accordance with FIG. 1, in which the discharge function of condenser 46 can be made linear. It has been found that some difficulties may arise if the discharge function is exponential. As a result, very small changes of the potential jump $\Delta U$ cause a large change of the impulse period $t_1$ when operating at the lower part of the curve, that is, with long times. The circuit in accordance with FIG. 6 permits approach toward a linear relationship between change in the potential jump $\Delta U$ and change of the impulse period $t_1$.

FIG. 6, as well as the other variations and embodiments of circuit, use the same reference numerals for those parts of the circuit of FIG. 1 reproduced therein, which are the same. These parts will not be described again.

The right electrode of condenser 46 is connected to the collector of an npn transistor 68, the emitter of which is connected directly to the negative line 49. The base of transistor 68 is connected to the junction of a voltage divider formed of resistances 69, 70 connected between the positive and negative buses.

Figure 7:
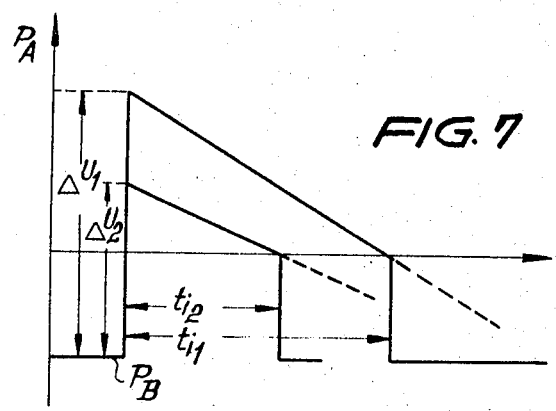
FIG. 7 is a diagram to illustrate the action of the circuit in accordance with FIG. 6.

The emitter-collector path of transistor 68 is placed instead of resistance 47 of FIG. 1 in the position of the discharge resistance for condenser 46. Since an approximately constant voltage is provided by the voltage divider 69, 70 to the base of transistor 68, the collector current is substantially independent of the potential between collector and emitter. The potential on condenser 46 thus decreases linearly with time and potential $P_A$ at test point A will be in accordance with the graph shown in FIG. 7. The impulse period $t_{11}$ and $t_{12}$ are then an approximate linear function of the potential jumps $\Delta U_1$ and $\Delta U_2$, indicated as an example.

Figure 8:
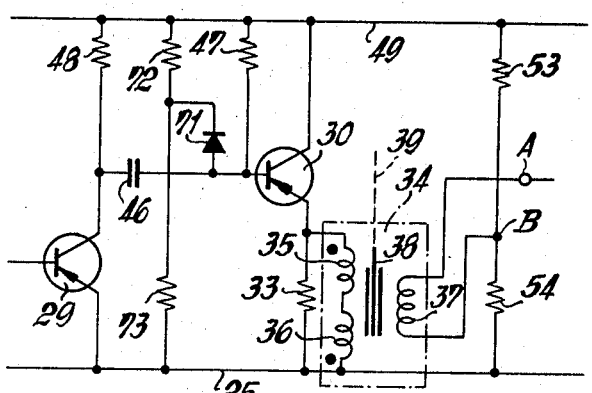
FIG. 8 is a different embodiment of the circuit in accordance with FIG. 1, in part.
Figure 9:
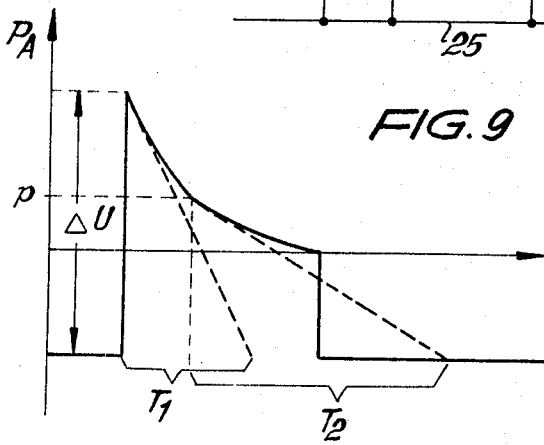
FIG. 9 is a diagram illustrating operation of the circuit according to FIG. 8.

FIG. 8 illustrates another embodiment of the circuit of FIG. 1, in which again the discharge function of condenser 46 can be modified. Again, similar parts have similar reference numerals. As before, a non-linear circuit element is used. Diode 71 connects to the tap point of a voltage divider formed of resistances 72, 73 connected across the positive and negative lines. The resistances 72 and 73 are so chosen that when transistor 29 becomes conductive, the potential at their junction point initially is less than the potential of the right electrode of condenser 46. Diode 71, as shown, is then conductive, so that condenser 46 can discharge over resistance 47 and diode 71, and the potential at its right electrode drops rapidly. As soon as this potential has decreased to a value which is equal to that of the junction between resistances 72 and 73, the diode 71 will block since no more potential will be between its anode and cathode. Condenser 46 thus will discharge from that point on only over resistance 47, so that the potential at its right electrode will drop slowly. FIG. 9 illustrates this change of potential graphically. First, the potential $P_A$, having a form corresponding to that of the right side of condenser 46, drops with a small time constant $t_1$. At the potential p indicated in FIG. 9, diode 71 blocks and the potential $P_A$ will drop with a larger time constant, that is, slower, as indicated at $T_2$.

The embodiment of FIG. 8 is particularly useful for engines which require a substantial amount of fuel initially, and a lesser increase as the throttle 43 is opened further.

Figure 10:
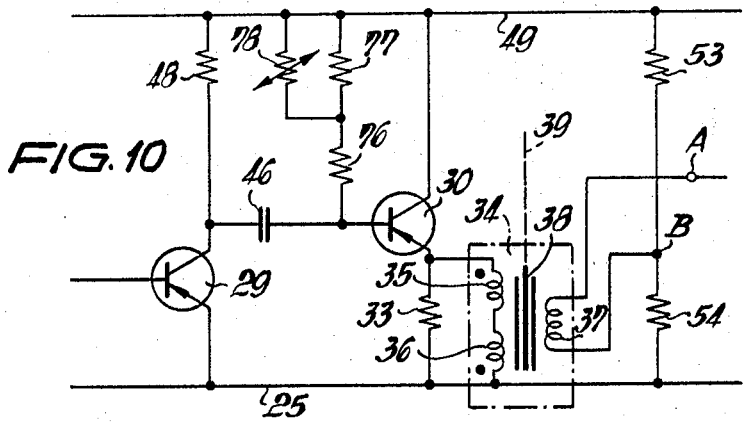
FIG. 10 is another modified circuit, in part, of FIG. 1.

FIG. 10 illustrates a third variation of the circuit of FIG. 1, in which the impulse period $t_1$ is made dependent not only on the vacuum in intake manifold 12 but further, on the temperature of motor 10. Upon change in temperature, a multiplication factor is applied to the impulse period so that when a predetermined vacuum within the intake manifold 12 is causing a predetermined time $t_1$, this time is changed by a predetermined percentage.

Figure 11:
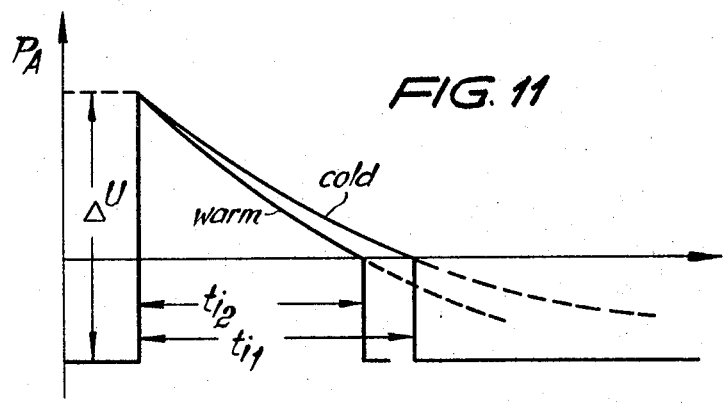
FIG. 11 is a diagram illustrating the action of the circuit of FIG. 10.

The right electrode of condenser 46, connected to the base of transistor 30 is further connected to negative bus 49 by means of a resistance network consisting of a resistance 76 in series with the parallel connection of a resistance 77 and a negative temperature co-efficient resistance 78. This resistance network replaces the resistance 47 of the circuit in accordance with FIG. 1. In all other respects the circuit remains the same and the reference numerals are the same. Negative temperature coefficient resistance 78 is secured to the engine 10 at a suitable position in such a manner that, with a cold engine 10, it is in its high resistance condition. As seen in FIG. 11, condenser 46 discharges only slowly when the engine is cold, giving an impulse period $t_{11}$. As the engine 10 warms up, temperature sensitive resistance 78 drops in resistance value, so that condenser 46 discharges faster and the shorter impulse period seen at $t_{12}$ results.

Figure 12:
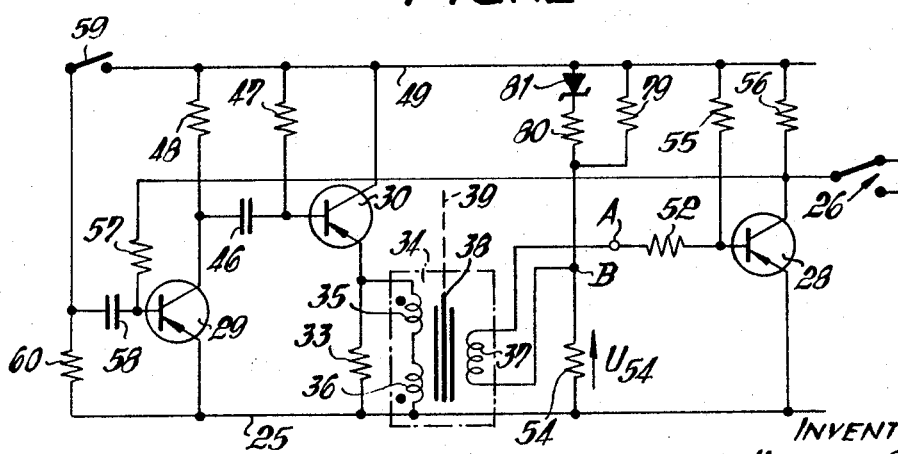
FIG. 12 is another modified circuit, in part.

FIG. 12 illustrates yet another embodiment of the circuit of FIG. 1 containing an arrangement to correct the effects of changes in battery voltage—usually unavoidable in automotive vehicles. The electromagnetically operated injection valves 13 have a slight time delay when opening which increases with decreasing battery voltage, that is, the lower the battery voltage, the slower the operating time of the valve. In order to compensate this effect, the impulse duration is increased as the battery voltage decreases (additive correction), so that the effect on injected fuel will be the same as if full battery potential were present.

As seen in FIG. 12, point B is connected to the negative bus 49 by means of a resistance network which includes a resistance 80 series connected with a Zener diode 81 both in parallel with a resistance 79. Zener diode 81 serves as a voltage dependent resistance and is so chosen, that the Zener potential is less than the smallest potential to be expected under operation. As a result, the potential between point B and the negative bus 49 will be always essentially constant, whereas the potential $u_{54}$ (FIG. 12) between point B and the positive line 25—which at the same time is the bias potential for transistor 28—will be strongly dependent on the value of the battery potential across lines 25, 49. If, for example, Zener diode 81 has a Zener potential of 8 v., and a potential between positive line 25 and negative line 49 has dropped to 8.5 v., then a potential of 0.5 v. will remain between point B and positive line 25. If, however, the potential between lines 25 and 49 is 12.6 v. the potential between point B and positive bus 25 will be 4.6 v.

Figure 13:
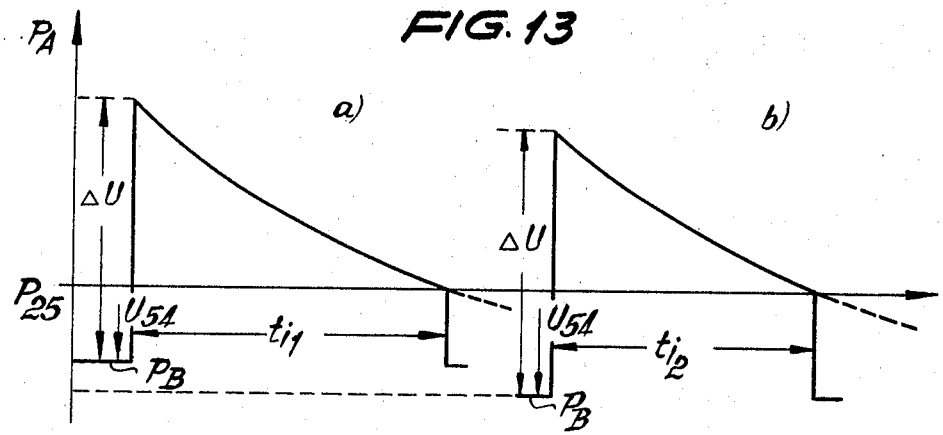
FIG. 13 is a diagram illustrating the action of the circuit of FIG. 12.

FIG. 13 illustrates the influence of these potential changes. The graph beneath portion $a$ is the potential curve for a potential between lines 25 and 49 which is too low; the graph under $b$ shows the potential curve for correct battery voltage. In both instances, the vacuum in intake manifold 12 and the position of iron core 38 are the same.

In the case $a$, the potential $u_{54}$ across resistance 54 is small, so that the potential jump $\Delta U$ causes a high positive potential at point A, and thus at the base of transistor 28. Only after a comparatively long impulse time $t_{l1}$ will this potential drop to that of the positive bus 25, at which time transistor 28 again becomes conductive. If, however, the potential $u_{54}$ is large, as seen in FIG. 13 under $b$, the potential jump $\Delta U$ of equal amplitude causes a less positive potential at A, and thus a shorter impulse period $t_{l2}$. The impulse periods $t_{l1}$ and $t_{l2}$ in the indicated example, are approximately 6:5.

Figure 18:
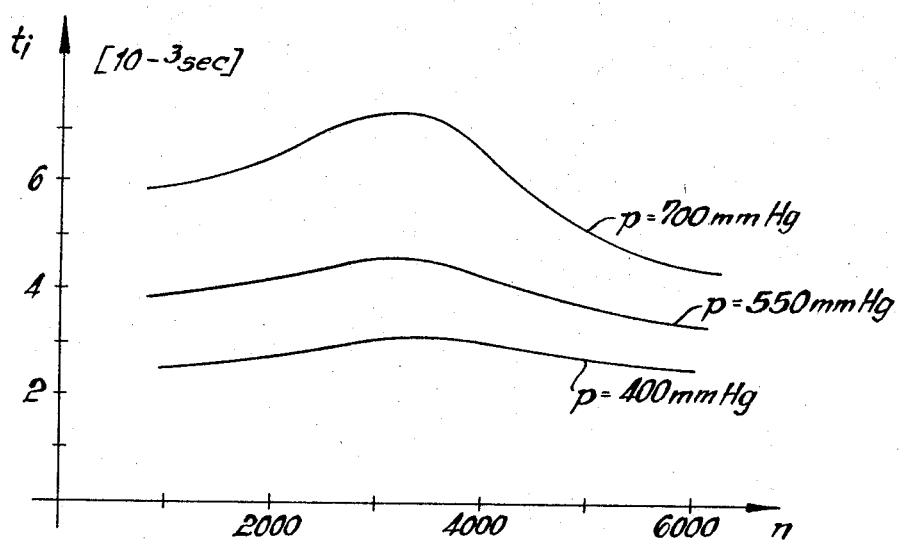

The embodiment of the invention illustrated in FIG. 14 utilizes the solutions in accordance with FIG. 1, FIG. 10 and FIG. 12. For similar parts, the same reference numerals have been used. Additionally, FIG. 14 illustrates a further network which makes the impulse period $t_1$, and with it the injected amount of fuel further dependent on the speed of the motor 10. Experiments on the test bench as well as in actual use have shown that the injected amount of fuel should not only be dependent on the vacuum in the intake manifold, but should further be varied as the speed of the motor changes—even if such variation is of lesser importance than the control derived from the vacuum. The additional network of FIG. 14 provides a further network to control the conductivity of an npn transistor 82 in the discharge circuit of condenser 46. The conductivity of this transistor 82 is changed during each impulse period in dependence on the impulse frequency, and thus on the speed of shaft 17. By suitably changing this conductivity, the desired dependence of the discharge time $t_1$ from the speed of the motor can be achieved with surprising simplicity, as illustrated in FIG. 18 for a four cylinder engine of predetermined design characteristics.

FIG. 14, specifically, shows that the right electrode of condenser 46 is connected to the base of transistor 30 and further to the collector of transistor 82. The emitter of transistor 82 connects over a resistance 83 to negative bus 49. The base of transistor 82 likewise connects over a resistance 84 to negative bus 49. Additionally, the base of transistor 82 is connected over a resistance 85 with the output of a further network having a pair of temporally sequential effective switches 90, 91 and a phase inversion stage 92. Each of switches 90, 91 as well as phase inversion stage 92 have an npn switching transistor 93, 94, 95, respectively.

Specifically, the additional network formed of switches 90, 91 and inverter 92 is constructed as follows: The base of transistor 93 connects over a condenser 96 with the collector of transistor 28 and over a resistance 97 with the negative bus 49. The emitter of transistor 93 connects directly to the positive bus 25; its collector over a collector resistance 98 to negative bus 49. Further, the collector of transistor 93 is connected over a condenser 101, forming a time delay, with the base of transistor 94, and additionally over a resistance 102 with the base of transistor 95. A resistance 104 connects the other side of condenser 101 to negative bus 49.

The emitter of transistor 94, 95 is applied directly to positive bus 25; the collector of transistor 94 connects with a resistance 103 to negative bus 49; the base of transistor 94 is connected to the other side of condenser 101 and also to resistance 104, previously referred to. Further, the collector of transistor 94 connects over a resistance 105 with one electrode of a condenser 106; the other electrode connects to the positive bus 25. The junction of resistance 105 and condenser 106 connects over a resistance 107 to a junction 108 and to one electrode of a condenser 109, the other electrode of which is connected with positive bus 25.

In some instances it is advantageous to provide, in parallel with resistance 105, a series connection of a resistance 112 and a diode 113, poled to be conductive for the discharge of condenser 106. This further changes the dependence of injected fuel on the speed of motor 10, as will be explained in detail below.

The collector of transistor 95 connects over a resistance 114 with negative line 49, and directly to the anode of a diode 115, the cathode of which connects to junction 108.

Operation of the circuit in accordance with FIG. 14: when switch 59 closes—timed in accordance with the speed of the engine—the monostable multivibrator, including transistors 28, 29, 30, is triggered, so that a negative pulse will appear at the collector of the output transistor 28. The time duration of this pulse—as previously described—depends on the position of the iron core 38 of the differential transformer 34, the temperature of the engine as determined by the negative temperature coffiecient resistance 78, the voltage of the battery supply (circuit including Zener diode 81) between the buses 25, 49 and further, the speed of the motor 10, as modified by the additional network including switches 90, 91 and inverter 92.

FIGS. 15 to 17 illustrate, in the upper row, the negative impulses measured at the collector of transistor 28, assuming a constant potential between lines 25 and 49, constant temperature of the engine 10 and a constant position of the iron core 38. For these diagrams, the speed of the engine is varied, however; FIG. 15 illustrates the relationship with a speed of 2,400 r.p.m.; FIG. 16, 3,200 r.p.m., and FIG. 17, 4,800 r.p.m.

The transistors 93 and 94 of switches 90, 91 are normally conducting, and held in this state by the two resistances 97, 104. The transistor 95, connected over resistance 102 to the collector of transistor 93, and serving as an inverter stage, will then be blocked.

If at time $t_1$ a negative pulse is applied from the transistor 28 over condenser 96 to the base of transistor 93, as illustrated at $u_{28}$ in FIGS. 15–17, then transistor 93 first will become more conductive and then, at a period of time $t_2$, when impulse $u_{28}$ again becomes positive, the transistor will block. Condenser 96 is chosen to be of fairly substantial size, so that it acts as a time delay, causing transistor 93 to remain blocked up to a time $t_3$. When transistor 93 blocks, that is, at time $t_2$, transistor 95 becomes conductive, so that its collector becomes strongly positive. The conductive transistor 95 establishes a connection from positive line 25, diode 115, junction 108, to the condenser 109, which will be shorted out, so that no potential can build up in the period from $t_2$ to $t_3$ thereacross. At point of time $t_3$, when transistor 93 again becomes conductive, transistor 95 will block.

The potential on condenser 109 is illustrated in FIG. 15 at the lowest row. As seen, in the period of time $t_2 \ldots t_3$ it is equal to 0.

At time $t_3$, transistor 93 again becomes conductive since condenser 96 has discharged over the resistance 97. So long as transistor 93 remains blocked, condenser 101 can charge. As soon as transistor 93, the collector resistance 98 of which is of low value, again becomes conductive, the charge stored in condenser 101 raises the base potential of transistor 94 over the potential of positive bus 25, and thus blocks the transistor 94 until condenser 101 has sufficiently discharged over resistance 104. That period of time is indicated at $t_4$ in FIG. 15. Transistor 94 can block only at that period, $t_4$. This is illustrated in FIG. 15 in the third row from above, indicating the potential on the collector of transistor 94, $u_{94}$.

So long as transistor 94 remains blocked, condensers 106 and 109 are charged over resistances 105 and 107. The potential of junction 108, illustrated in the lowest row of FIG. 15, will become more negative as shown up to the period of time $t_4$; at that point, the condensers begin to discharge over transistor 94 which again becomes conductive. When the transistor 95 of the inverter stage 92 again becomes conductive, condenser 109 is suddenly discharged to zero, as has been previously described with respect to the period of time $t_2$, due to the short circuiting action of transistor 95.

The potential $u_{109}$ across condenser 109, and appearing at junction 108, is transmitted over resistance 85 to transistor 82, thus influencing its conductivity. When the potential $u_{109}$ is equal to 0, the transistor 82 is well conductive and condenser 46 of the multivibrator circuit 31 discharges rapidly, that is, the multivibrator has a short impulse period. If, however, the potential $u_{109}$ is substantial, transistor 82 is less conductive, since its base potential is shifted in a negative direction. Correspondingly, the impulse period of the output pulses at transistor 28 increase, since the discharge time constant for the condenser 46 is increased.

FIGS. 15 to 17 illustrate the effective portion of the potential $u_{109}$ by a heavy line. FIG. 15 is drawn for a speed of 2,400 r.p.m. The effective portion of potential 109, in FIG. 15, is slightly less than the maximum negative potential of condenser 109 (region between $t_1$ and $t_2$) resulting in an impulse period $t_{13}$. The maximum negative potential is indicated at the center graph with max. FIG. 16 illustrates the relationship for a speed of 3,200 r.p.m.; an effective potential, extending from the negative maximum to a somewhat lower value is seen, resulting in a longer impulse period $t_{14}$.

FIG. 17 indicates the relationship for a speed of 4,800 r.p.m. Condenser 109 is never charged to its full potential, and only a slightly negative potential $u_{109}$ will become effective, and the impulse period $t_{15}$ is shorter than the impulse periods $t_{13}$ or $t_{14}$.

The graph of FIG. 18 clearly shows how the recurring potential $u_{109}$ changes the period $t_1$ of the pulses effective at the injection valves 13 in dependence on speed. This potential $u_{109}$ periodically recurs during each impulse period. The maxima of the graphs are at a speed of approximately 3,400 r.p.m. and result in an injection quantity which is 20 percent over the injection quantity at 1,000 r.p.m., as required for a high performance engine of a certain design, in which at 3,000 r.p.m. a resonance condition obtains in the air column in the intake manifold, increasing the amount of combustible mixture applied to the various cylinders. As seen, the maximum positions of the curves in FIG. 18 are substantially independent of the vacuum in the intake manifold 12. The lowest curve in FIG. 18 corresponds to the highest vacuum. The particular construction of the additional networks 90, 91, 92 achieve this engine performance characteristic as seen in FIG. 18, wherein the ordinate is injection period and the abscissa is speed in r.p.m.

If, with slow speeds, a still lower quantity of injected fuel is to be obtained, then the resistance 112 and diode 113 showed in dashed lines in FIG. 4, network 91, may be used. Diode 113 permits a more rapid discharge of condensers 106, 109, so that the potential $u_{109}$, illustrated in FIG. 15, will have the form shown at the dashed lines 116, further decreasing the impulse period at low speeds. If the diode 113 is reversely poled, the impulse period at high speeds is increased, since condensers 106, 109 will be charged more rapidly and potential $u_{109}$ will also increase.

The network in accordance with the present invention provides a sturdy, flip-flop circuit readily adaptable to automotive use, and not requiring any expensive elements. The differential transformer 34 can be inexpensively constructed, since its input inductivity has hardly any influence on the impulse duration and thus no correction factors or adjustments must be built into the circuit for individual alignment. Of course, other forms of impulse transformers, may be utilized; for example, instead of shift of the iron core, one of the windings, for example, the secondary, can be moved.

The circuit is particularly advantageous because it provides for ready adjustment for characteristics of various motors; the condenser 46, the discharge circuit for the condenser 46, and the amplification of the impedance matching stage 30 as well as the potential at point B can be changed to accommodate their motors of various designs.

The differential transformer 34 preferably is so constructed that the reciprocal value of its lower limiting frequency is substantially larger than the longest impulse period demanded, so that the potential changes on its primary side are transmitted to the secondary without substantial distortion.

The control system of the present invention can be utilized not only with directly connected injection systems, but also with transistorized ignition systems, impulse controlled electro-magnetic couplings and the like, in which the duration of electrical impulses is to be substantially changed between rather small and comparatively long periods.

What is claimed is:

1. Controller for the fuel injection system for an internal combustion engine having an intake manifold and at least one electrically operable fuel injection valve, the amount of fuel injected being determined by the opening time of said valve, and an intake manifold pressure sensing means (40) connected in the intake manifold (12) of said engine to sense the vacuum therein, said controller comprising an electronic multivibrator circuit (31) having its output connected to said electrically operable valve to apply thereto pulses of varying time durations ($t_1$) to control the amount of injected fuel, said multivibrator circuit including a transistor (30) connected in emitter-follower configuration;

a timing storage condenser (46) connected to the base of said emitter-follower connected transistor (30) and a discharge circuit (47; 68, 69, 70; 71, 72, 73) connected to said timing storage condenser;

an output transistor (28) having its output connected to said electrically operable fuel injection valve;

a differential transformer (34) having a pair of series connected, oppositely wound primary windings (35, 36), a secondary winding (37) and a movable iron core (38) varying the coupling between said primary windings and said secondary winding, said iron core being connected to said intake manifold pressure sensing means (39) to position said core in said transformer with respect to said windings;

said series connected oppositely wound primary windings (35, 36) being connected to the emitter of said emitter-following transistor (30) and said secondary coil (37) being connected (A, B) to the base of said output transistor 28;

a D-C feedback circuit (57) interconnecting the output of the output transistor (28) and the input to said emitter-following transistor; and means (59, 58, 29) applying pulses in synchronism with rotation of the engine to said emitter-follower connected transistor, whereby the impulse time of said multivibrator circuit will be determined by said timing storage condenser and the discharge circuit connected thereto and the coupling between said windings of said differential transformer as determined by the position of the core and thus of intake manifold pressure.

2. Controller according to claim 1 wherein said means applying pulses to said emitter-follower transistor includes an input transistor (29), a pulse switch (59) opening and closing in synchronism with rotation of said engine, and connected to the base of said transistor, the collector of said transistor being connected to said timing storage condenser and to the base of the emitter-follower transistor; and said feedback circuit is connected to the base of said input transistor.

3. Controller according to claim 1 including a source of potential (25, 49);
a voltage divider (53, 54) having a tap point (B) connected across said source of potential, said secondary winding of said differential transformer having one terminal connected to the base of said output transistor (28) and the other terminal to the tap point of said voltage divider.

4. Controller as claimed in claim 1 including a constant current element (FIG. 6: 68) included in the discharge circuit of the condenser (46).

5. Controller as claimed in claim 4 wherein said constant current element (68) is a transistor having its emitter-collector path connected to form the discharge circuit for the condenser; and means providing a substantially constant potential (69, 70; 25, 49) are provided across the emitter-base path of the transistor (68).

6. Controller as claimed in claim 1 including a diode (FIG. 8: 71) having one electrode connected in the discharge circuit of the condenser (46) and means (25, 49; 72, 73) providing a substantially constant bias to the other electrode of the diode.

7. Controller as claimed in claim 1 including a negative temperature coefficient resistance (FIG. 10: 78) connected in the discharge circuit of the condenser (46).

8. Controller as claimed in claim 1 wherein one terminal (A) of the secondary (37) of the differential transformer (34) is connected to the input of the second stage (28); a voltage divider (FIG. 1: 53, 54; FIG. 12: 79, 80, 81, 54) furnishing a source of potential is provided, and another terminal (B) of the secondary of said differential transformer is connected to the tap point of said voltage divider.

9. Controller as claimed in claim 8 wherein said voltage divider (FIG. 12: 79, 80, 81, 54) includes a Zener diode (81), said Zener diode being connected to provide lesser amplification in the second stage of said multivibrator, and thus shorter impulse time ($t_1$) with increased potential across the voltage divider.

10. Controller as claimed in claim 1 wherein the discharge circuit of the condenser (46) includes a controlled resistance (FIG. 14: 82) and means are provided (90, 91, 92) sensing the speed of said engine, and thus the switching frequency of said multivibrator circuit, said means being connected (84, 85) to control the conductivity of said controlled resistance (82).

11. Controller as claimed in claim 10 wherein said controlled resistance is a transistor (82) having its emitter-collector path in the discharge circuit of the condenser (46); and said speed sensing means (90, 91, 92) provide output pulses to the control electrodes of said transistor, said pulses having a cyclically changing potential ($u_{109}$) varying in synchronism with the pulses of said multivibrator circuit, the beginning of any cycle ($t_2$) of said output pulses coinciding with the termination of the preceding pulse of said multivibrator circuit (31).

12. Controller as claimed in claim 11 wherein said speed sensing means (90, 91, 92) includes a pair of sequentially switching transistors (93, 94), the second transistor (94) of said pair including an auxiliary condenser (109) connected in parallel to the control electrodes of the transistor forming said controlled resistance (82).

13. Controller as claimed in claim 12 including a controlled stage (92) providing a fixed potential at the beginning of each switching cycle of the first transistor of said pair (93) and a diode (115) connected and poled to apply said fixed potential at the beginning of said cycle to the auxiliary condenser (109), whereby the initial potential of the cyclically changing potential ($u_{109}$) applied to said condenser, and hence to the control electrodes of said transistor forming the controlled resistance (82) will be the same.

14. Controller as claimed in claim 12 including a nonlinear circuit means (112, 113) modifying the current flow rate through said auxiliary condenser (109).

15. Controller as claimed in claim 1 including nonlinear circuit means (FIG. 6: 68; FIG. 8: 71; FIG. 10: 78), connected in the discharge circuit of said condenser (46).

16. Controller as claimed in claim 15 wherein said nonlinear circuit means are controlled circuit elements; and a control network is provided connected to said nonlinear circuit means determining the operating characteristics of said circuit means and thus controlling the discharge rate of said condenser (46) and hence the pulse duration ($t_1$) of said multivibrator circuit.

References Cited
UNITED STATES PATENTS

| | | | |
|---|---|---|---|
| 2,992,640 | 7/1961 | Knapp | 123—119 |
| 3,005,447 | 10/1961 | Baumann | 123—119 |
| 3,203,410 | 8/1965 | Scholl | 123—119 |
| 3,338,221 | 8/1967 | Scholl | 123—32 |

LAURENCE M. GOODRIDGE, Primary Examiner.

U.S. Cl. X.R.

123—119